United States Patent
Yuk et al.

(10) Patent No.: US 9,497,696 B2
(45) Date of Patent: Nov. 15, 2016

(54) TECHNIQUES FOR REGION-BASED SCANNING OF DIFFERENT FREQUENCY BANDS FOR USE IN A WIRELESS LAN

(71) Applicant: SAMSUNG SDS CO., LTD., Seoul (KR)

(72) Inventors: Young Soo Yuk, Seoul (KR); Yang Hwan Joe, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 35 days.

(21) Appl. No.: 14/482,059

(22) Filed: Sep. 10, 2014

(65) Prior Publication Data
US 2015/0071275 A1    Mar. 12, 2015

(30) Foreign Application Priority Data
Sep. 10, 2013    (KR) .................. 10-2013-0108194

(51) Int. Cl.
  H04W 4/00    (2009.01)
  H04W 48/16   (2009.01)
  H04W 84/12   (2009.01)

(52) U.S. Cl.
  CPC ............. *H04W 48/16* (2013.01); *H04W 84/12* (2013.01)

(58) Field of Classification Search
  None
  See application file for complete search history.

(56) References Cited

U.S. PATENT DOCUMENTS

| | | | | |
|---|---|---|---|---|
| 2008/0096554 A1* | 4/2008 | Kim | .......... | H04W 48/16 455/434 |
| 2009/0111466 A1* | 4/2009 | Montemurro | ..... | H04W 52/0209 455/434 |
| 2009/0298452 A1* | 12/2009 | Ota | .......... | H03J 1/0091 455/161.1 |
| 2010/0214958 A1* | 8/2010 | Wijayanathan | .......... | H04W 8/18 370/255 |
| 2011/0124337 A1* | 5/2011 | Lam | .......... | H04W 48/16 455/434 |
| 2013/0028158 A1* | 1/2013 | Lee | .......... | H04W 52/0206 370/311 |
| 2013/0136212 A1* | 5/2013 | Shirasuka | .......... | H04N 5/4401 375/340 |
| 2013/0171941 A1* | 7/2013 | Kenney | .......... | H04W 76/023 455/62 |
| 2013/0225165 A1* | 8/2013 | Das | .......... | H04W 48/16 455/434 |
| 2014/0066055 A1* | 3/2014 | Balakrishnan | .......... | H04W 48/18 455/432.1 |
| 2014/0219194 A1* | 8/2014 | Varoglu | .......... | H04W 76/043 370/329 |
| 2014/0256342 A1* | 9/2014 | Abdelmonem | .......... | H04B 1/1036 455/452.1 |
| 2014/0269468 A1* | 9/2014 | Jia | .......... | H04W 24/02 370/311 |
| 2014/0274039 A1* | 9/2014 | Shah | .......... | H04W 48/16 455/434 |
| 2014/0274040 A1* | 9/2014 | Venkatraman | .......... | H04W 48/16 455/434 |
| 2014/0362782 A1* | 12/2014 | Yuk | .......... | H04W 72/042 370/329 |

* cited by examiner

*Primary Examiner* — Otis L Thompson, Jr.
(74) *Attorney, Agent, or Firm* — Sughrue Mion, PLLC

(57) ABSTRACT

A communication method implemented in a mobile device is provided. The communication method includes limiting a frequency band on which the mobile device performs a scanning operation to a first frequency band used for a wireless connection of the mobile device; determining whether it is necessary to scan a second frequency band during a subsequent scanning operation of the mobile device; and in response to determining that it is necessary to scan the second frequency band, allowing the subsequent scanning operation to be performed on a plurality of frequency bands including the first and second frequency bands.

16 Claims, 7 Drawing Sheets

TECHNIQUES FOR REGION-BASED SCANNING OF DIFFERENT FREQUENCY BANDS FOR USE IN A WIRELESS LAN

CROSS-REFERENCE TO RELATED APPLICATION

This application claims priority to and the benefit of Korean Patent Application No. 2013-0108194, filed on Sep. 10, 2013, the disclosure of which is incorporated herein by reference in its entirety.

BACKGROUND

1. Field

The present disclosure relates to wireless network technology, and more particularly, to technology for setting a frequency band to be scanned in a wireless local area network (WLAN) in which a plurality of frequency bands are used.

2. Discussion of Related Art

Recently, a demand for mobile devices has been drastically increased. Mobile devices communicate radio signals with access points (APs) that provide access to a wireless network through defined frequency channels. A typical example of such a wireless network that provides a service for a mobile device is a WLAN, which is widely used for business purposes, public facility-related purposes, personal purposes, and so on. The Institute of Electrical and Electronics Engineers (IEEE) 802.11 standard for a WLAN mainly covers a physical layer and a media access control (MAC) layer.

A WLAN system includes one or more basic service sets (BSSs). A BSS is a set of stations that can be synchronized to communicate with one another. In a broad sense, the stations include AP stations and non-AP stations. For the sake of convenience, however, an AP station may be simply referred to as an AP and a non-AP station as a station. Meanwhile, a non-AP station may also be referred to as a mobile station (MS), a mobile terminal, user equipment (UE), or the like.

FIG. 1 schematically shows an exemplary configuration of a WLAN.

As shown in FIG. 1, stations 152 and 154 may access a WLAN 100 via APs 111, 113, 115, 117, 121, 123, and 125. For example, the access to the WLAN 100 may be performed according to a protocol of the IEEE 802.11 standard. Such a WLAN 100 as mentioned above is referred to as an infrastructure network. In the WLAN 100, each of the APs 111, 113, 115, 117, 121, 123, and 125 manages the station(s) 152 and/or 154 associated with itself as one or more entities constituting a BSS. The APs 111, 113, 115, 117, 121, 123, and 125 are identified by basic service set identifiers (BSSIDs).

The exemplary WLAN 100 includes a distribution system (DS) that interconnects the plurality of APs 111, 113, 115, 117, 121, 123, and 125 and provides an extended service set (ESS), although it is not shown in FIG. 1. As a mechanism for one AP to communicate with another AP, such a DS enables an AP to transmit a frame to stations connected to a BSS managed by the AP, deliver a frame to a station that has moved to another BSS, or deliver a frame over an external network such as a wired network. As such, APs and stations included in one ESS may communicate with one another. In other words, a single ESS may be considered as a single logic network segment present in one Internet protocol (IP) subnet. Such an ESS is identified by a service set identifier (SSID). As shown in FIG. 1, the SSID "mobile" is an identifier indicating the WLAN 100 and is transmitted from the APs 111, 113, 115, 117, 121, 123, and 125 as information indicating the presence of the WLAN 100. According to the IEEE 802.11 standard, an SSID may be signaled using a management frame named a beacon frame or another one named a probe response frame.

Under such a scenario, the stations 152 and 154 may roam between the different APs 111, 113, 115, 117, 121, 123, and 125 having the same SSID. In other words, in the WLAN 100 (SSID: mobile), the stations 152 and 154 may move from one BSS to another BSS through roaming. For example, when the station 152 connected to the AP 113 moves and a communication signal from the AP 113 is attenuated, the station 152 attempts to connect to another AP (e.g., the AP 115) to change its connection point before the connection to the AP 113 is completely lost. In a preparatory process for such roaming, the station 152 scans frequency bands (e.g., the 2.4 GHz frequency band and the 5 GHz frequency band) used for wireless connections in the WLAN 100 to search for an AP that sends a signal at a satisfactory level. The scanning may follow either an active scanning mode or a passive scanning mode. According to the active scanning mode, the stations 152 and 154 transmit probe request frames and then wait for probe response frames. According to the passive scanning mode, the stations 152 and 154 wait for beacon frames from the APs 111, 113, 115, 117, 121, 123, and 125. For example, the station 152 discovers the AP 115 from which a beacon frame or a probe response frame is received at a higher strength, selects the AP 115 as an AP to which a new connection is to be made, and sends a reassociation request frame to the AP 115.

It is of primary importance to improve the communication performance of a mobile device in a wireless network (e.g., WLAN) for providing a service to the mobile device. Particularly, for an application such as voice over IP (VoIP) or video conference that actually requires real-time delivery of voice/image traffic, it is necessary to maintain such a traffic flow in a stable manner. In addition, it is preferable to prevent degradation of the communication performance caused by radio interference in some frequency band for use in wireless connections in the wireless network.

SUMMARY

According to an exemplary embodiment, there is provided a communication method implemented in a mobile device, the communication method including: limiting a frequency band on which the mobile device performs a scanning operation to a first frequency band used for a wireless connection of the mobile device; determining whether it is necessary to scan a second frequency band during a subsequent scanning operation of the mobile device; and in response to determining that it is necessary to scan the second frequency band, allowing the subsequent scanning operation to be performed on a plurality of frequency bands including the first and second frequency bands.

The communication method may further include limiting a frequency band on which another subsequent scanning operation of the mobile device is performed to a frequency band which is used for a wireless connection of the mobile device after the subsequent scanning operation is performed on the plurality of frequency bands.

The determining of whether it is necessary to scan the second frequency band may be based on whether a signal indicating a loss of the wireless connection of the mobile device using the first frequency band is received.

The determining of whether it is necessary to scan the second frequency band may be based on a quality of a link for the wireless connection of the mobile device using the first frequency band.

The communication method may further include measuring the quality of the link using a parameter including a received signal strength indication (RSSI).

The communication method may further include acquiring information indicating one or more wireless devices, and the determining of whether it is necessary to scan the second frequency band may be based on whether a first wireless device connected with the mobile device using the first frequency band is included in the one or more wireless devices.

The one or more wireless devices may provide wireless connections using the first frequency band, and the one or more wireless devices may be located in a boundary region between a first region in which the first frequency band is used for a wireless connection of the mobile device and a second region in which the second frequency band is used for a wireless connection of the mobile device.

The determining of whether it is necessary to scan the second frequency band may be based on a quality of a link for the wireless connection of the mobile device using the first frequency band.

The communication method may further include measuring the quality of the link using a parameter including an RSSI.

The information may be acquired from a server communicatively connected with the first wireless device.

The plurality of frequency bands may include a 2.4 GHz frequency band and a 5 GHz frequency band.

The communication method may further include: monitoring a state of data communication across the wireless connection of the mobile device; and in accordance with the monitored state, selecting one of a plurality of schemes for determining whether it is necessary to scan the second frequency band.

When the monitored state is an inactive state, the selected scheme may include determining, based on whether a signal indicating a loss of the wireless connection of the mobile device is received, whether it is necessary to scan the second frequency band.

When the monitored state is an active state, the selected scheme may include determining, based on a quality of a link for the wireless connection of the mobile device using the first frequency band, whether it is necessary to scan the second frequency band.

The communication method may further include acquiring information indicating one or more mobile devices, and when the monitored state is an active state, the selected scheme may include determining, based on whether a first wireless device connected with the mobile device using the first frequency band is included in the one or more mobile devices, whether it is necessary to scan the second frequency band.

The selected scheme may further include determining, based on a quality of a link for the wireless connection of the mobile device using the first frequency band, whether it is necessary to scan the second frequency band.

According to another exemplary embodiment, there is provided a computer-readable storage medium having computer executable instructions stored thereon which implement the above-described communication method.

BRIEF DESCRIPTION OF THE DRAWINGS

The above and other objects, features, and advantages of the present disclosure will become more apparent to those familiar with this field from the following detailed description when taken in conjunction with the accompanying drawings, in which.

DETAILED DESCRIPTION OF EXEMPLARY EMBODIMENTS

Hereinafter, detailed embodiments of the present disclosure will be described with reference to drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those familiar with this field.

Figure 2:
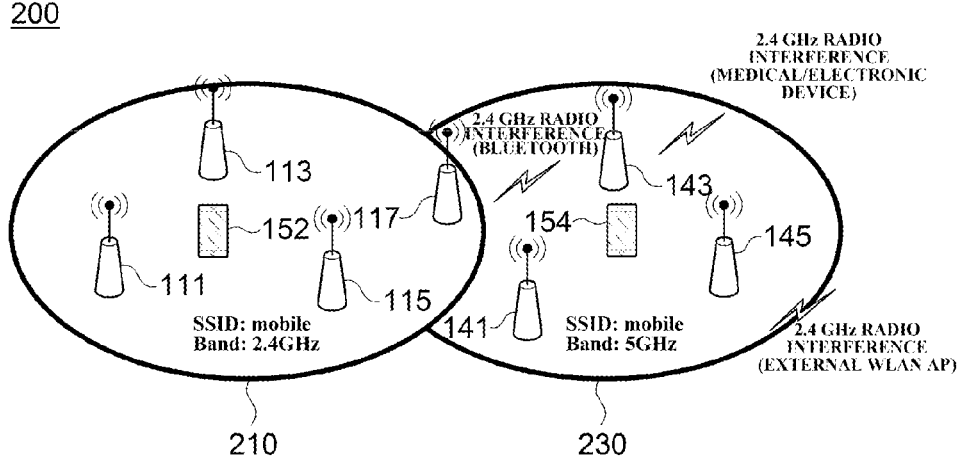
FIG. 2 schematically shows an exemplary configuration of a WLAN.

FIG. 2 schematically shows an exemplary configuration of a WLAN.

Figure 1:
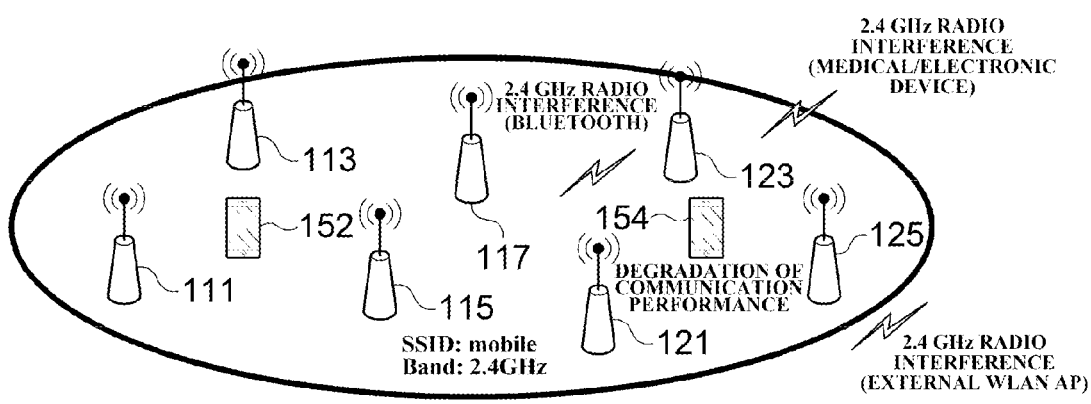
FIG. 1 schematically shows an exemplary configuration of a wireless local area network (WLAN)

A WLAN 200 is different from the WLAN 100 of FIG. 1 in that APs 141, 143, and 145 in an area 230 are configured to provide wireless connections using a 5 GHz frequency band. The WLAN 200 is configured in this manner to prevent the communication performance of the station 154 from being degraded by radio interference from medical/electronic devices, Bluetooth devices, APs of an external WLAN, and the like, which communicate in the 2.4 GHz frequency band through which, in the WLAN 100, the APs 121, 123, and 125 would provide wireless connections.

Oftentimes, when stations 152 and 154 continues to scan both of the 2.4 GHz and the 5 GHz frequency bands to discover a nearby AP 111, 113, 115, 117, 141, 143, or 145, an excessive number of such scanning operations may result in an undesirably long time delay. In particular, when an application susceptible to transmission delay, for example, a VoIP or video conference application, is executed in the stations 152 and 154, scanning all frequency bands that are used in the WLAN 200 may destabilize traffic flows from and/or to the stations 152 and 154. In order to prevent such resultant transmission delay and ensure a quality of service (QoS) of the application at a desired level, it may be preferable for the stations 152 and 154 to perform AP discovery only on a particular frequency band, in certain situations. For example, when the station 152 initially scans both of the 2.4 GHz and the 5 GHz frequency bands in an area 210 and then connects to the AP 113 that provides a wireless connection over the 2.4 GHz frequency band, the station 152 may fix the frequency band to be subsequently scanned to the 2.4 GHz frequency band. In the area 210 where the station 152 is located, such an AP discovery scheme is more efficient than a scheme of consistently scanning both the 2.4 GHz and 5 GHz frequency bands for use in the WLAN 200.

When the stations 152 and 154, set to scan a particular frequency band as mentioned above, move to an area in which wireless connections are provided in another frequency band, the stations 152 and 154 could fail to find any APs that use the particular frequency band and, therefore, might be disconnected from the WLAN 200. For example, when the station 152 set to scan only the 2.4 GHz frequency band in the area 210 moves to an area 230 for the 5 GHz frequency band, the station 152 discovers none of the APs 141, 143, and 145 that transmit information indicating the presence of the WLAN 200, for example, indicated as "SSID: mobile," using channels in the 5 GHz frequency band. Accordingly, the station 152 would lose a connection for providing a service (e.g., VoIP or video conference service) to the station 152.

Exemplary embodiments of the present disclosure provide techniques for limiting the frequency band to be scanned by a mobile device (for example, a station) in a wireless network (for example, a WLAN) to a frequency band, and then, if it is necessary to scan a different frequency band, setting the frequency to be scanned as the different frequency band, thereby ensuring service continuity at a sufficient level in a wireless network environment in which multiple frequency bands are used.

Figure 3:
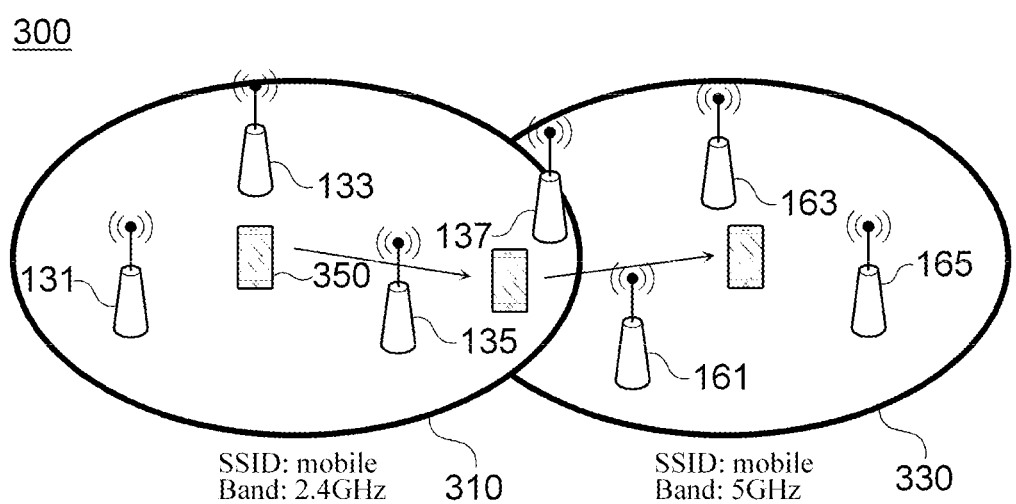
FIG. 3 shows a WLAN environment according to an exemplary embodiment of the present disclosure.

FIG. 3 shows a wireless local area network (WLAN) environment according to an exemplary embodiment of the present disclosure.

As shown in FIG. 3, an exemplary WLAN 300 includes access points (APs) 131, 133, 135, 137, 161, 163, and 165 and a station 350. The APs 131, 133, 135, 137 in an area 310 deliver information indicating the presence of the WLAN 300, for example, a service set identifier indicated as "SSID: mobile," using a 2.4 GHz frequency band. The APs 161, 163, and 165 in an area 330 deliver information indicating the presence of the WLAN 300, for example, indicated as "SSID: mobile," using a 5 GHz frequency band. In the WLAN 300, the APs 131, 133, 135, and 137 in the area 310 provide connections through the 2.4 GHz frequency band, and the APs 161, 163, and 165 in the area 330 provide connections through the 5 GHz frequency band. In other words, the 2.4 GHz frequency band is used for a wireless connection over the area 310, and the 5 GHz frequency band is used for a wireless connection over the area 330.

It is now assumed that in the WLAN 300, the station 350 moves along the arrows shown in FIG. 3. The station 350 may be initialized in the area 310 to scan a plurality of frequency bands including the 2.4 GHz and 5 GHz frequency bands. According to a result of the scanning, the station 350 may connect to the AP 131, which provides a wireless connection using the 2.4 GHz frequency band, and limit a frequency band which is to be subsequently scanned by the station 350 to the 2.4 GHz frequency band. The station 350 may then be newly connected to the AP 135 and, in that case, may still remain in an AP discovery mode for scanning the limited frequency band.

On the other hand, as the station 350 moves further along the arrows, a need may arise for the station 350 to scan the 5 GHz frequency band. For example, when the station 350 moves out of the area 310 or is located in a boundary region between the area 310 and the area 330, the station 350 may need to scan the 5 GHz frequency band during its subsequent scanning operation. For the sake of illustration, it is assumed that while the station 350 moves further along the arrows of the FIG. 3 after being connected to the AP 135, the station 350 performs a scanning operation on the 2.4 GHz frequency band, discovers the AP 137, and connects to the AP 137. According to FIG. 3, the AP 137 provides a wireless connection using the 2.4 GHz frequency band in the area 310 and, notably, is located in a boundary region between the area 310 and the area 330. It can be said that since the station 350 is located in the boundary region between the area 310 and the area 330, the station 350 would possibly soon enter the area 330. Moreover, if the station 350 travels further along the right-hand arrow shown in FIG. 3, the station 350 may actually move out of the area 310 and enter the area 330. Therefore, there is a need that the station 350 detects that the station 350 moves out of the area 310 or enters the area 330, or that the station 350 would likely soon move out of the area 310 or enter the area 330, and in order to discover the AP 161, 163 or 165, which uses the 5 GHz frequency band, changes its AP discovery mode.

Accordingly, while performing a scanning operation only on the 2.4 GHz frequency band, the station 350 may determine whether it is necessary to scan the 5 GHz frequency band during a subsequent scanning operation. In response to the determination that it is necessary to scan the 5 GHz frequency band, the station 350 may perform the subsequent scanning operation on a plurality of frequency bands including the 2.4 GHz and 5 GHz frequency bands. In this example, there may be various ways to determine whether it is necessary to scan the 5 GHz frequency band. Several approaches may be utilized to compare a position of the station 350 with the range of the area 310 and that of the area 330. For example, determining whether it is necessary to scan the 5 GHz frequency band may involve checking, based on information indicating the position of the station 350, whether the station 350 has left the area 310 or whether the station 350 is located in the boundary region between the area 310 and the area 330. Some other approaches will be described below.

Afterwards, the station 350 may connect to the AP discovered in the subsequent scanning operation and limit the frequency band on which another subsequent scanning operation is to be performed. For example, when the station 350 scans both of the 2.4 GHz and 5 GHz frequency bands and detects the highest RSSI (Received Signal Strength Indication) from the AP 161 in the area 330, the station 350 may connect to the AP 161 and then limit, to the 5 GHz frequency band, the frequency band which is to be scanned after the connection is established.

When the station 350 moves from the area 330 to the area 310 along the backward directions of the arrows shown in FIG. 3, the station 350 may similarly operate as described above.

Figure 4:
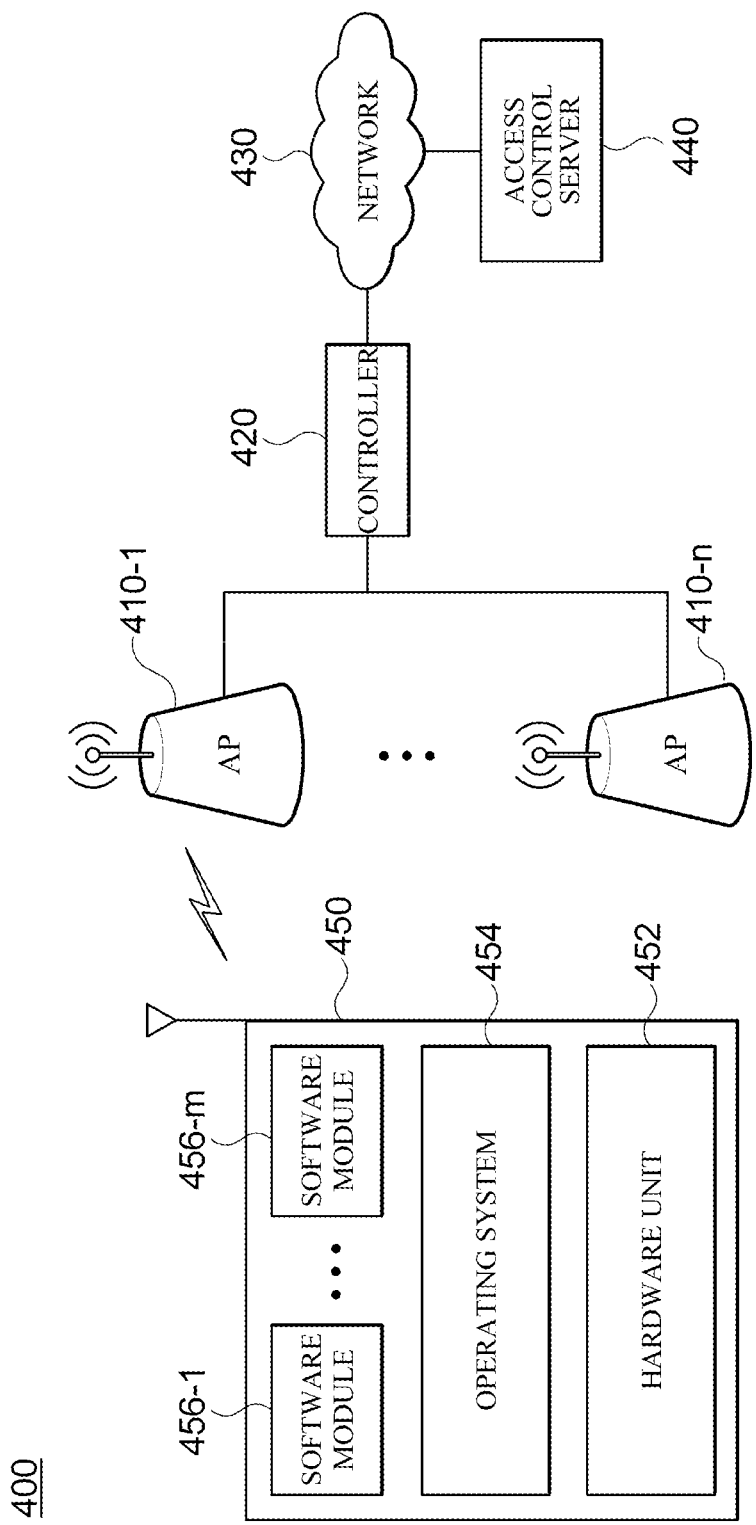
FIG. 4 shows an exemplary configuration of a WLAN environment according to an exemplary embodiment of the present disclosure.

FIG. 4 shows an exemplary configuration of a WLAN environment according to an exemplary embodiment of the present disclosure.

FIG. 4 illustrates that in a WLAN 400, a station 450 may connect to APs 410-1 to 410-*n*. The APs 410-1 to 410-*n* may include all or some of the APs 131, 133, 135, 137, 161, 163, and 165 shown in FIG. 3. At the back-end of the APs 410-1 to 410-*n*, a controller 420 may be communicatively connected to the APs 410-1 to 410-*n* and control communications through a network 430 such as the Internet or an intranet. In addition, a access control server 440 may control a connection of the station 450 and provide, through the network 430 to the station 450, information related with a connection to the WLAN 400. For example, the access control server 440 may maintain a list of APs located in a boundary region between the area 310 and the area 330, and transmit the list to the station 450.

By way of example, the station 450 may include hardware 452, an operating system 454, and software modules 456-1 to 456-*m*. The station 350 shown in FIG. 3 may be configured in the same manner as the station 450.

The hardware 452 may include a processor, a memory, and a transceiver. The operating system 454 may be a module for acting as an intermediary between the hardware 452 and the software modules 456-1 to 456-*m* and provide an environment in which a user of the station 450 executes the software modules 456-1 to 456-*m* in a convenient manner. For example, the operating system 454 may be iOS of Apple Inc. or Android of Google Inc.

The software modules 456-1 to 456-*m* may include a software module for managing/controlling a connection of the station 450 to the WLAN 400. For example, the software module 456-1 may have a function of connecting the station only with a predetermined SSID, a function of limiting the frequency band which is to be scanned for AP discovery, a function of changing the AP discovery mode, for example, to allow the scanning of all frequency bands, instead of the limited frequency band, a function of receiving, from the operating system 454, a signal indicating a state of a connection of the station 450 (for example, whether the connection is lost), and/or a function of receiving, from the access control server 440, information or a policy related with the connection.

Changing of an AP Discovery Mode

Figure 5:
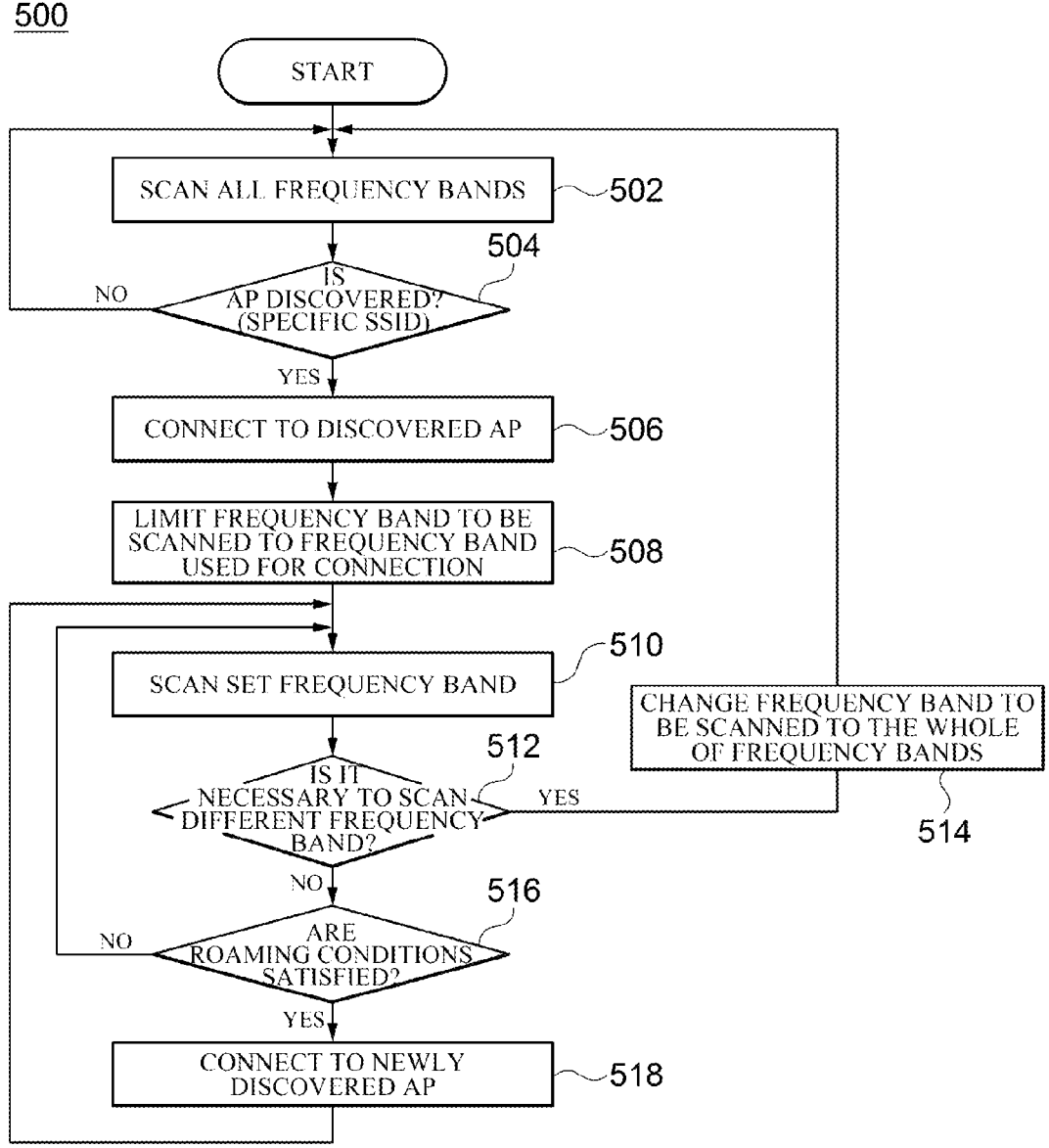
FIGS. 5 and 6 are respective flowcharts of exemplary processes in which a station sets a frequency band to be scanned, discovers an AP, and connects to the AP in a WLAN according to an embodiment of the present disclosure.

FIG. 5 is a flowchart of an exemplary process in which a station sets a frequency band to be scanned, discovers an AP, and connects to the AP in a WLAN according to an embodiment of the present disclosure.

For example, a process 500 illustrated in FIG. 5 may be performed by the station 350. In the process 500, the station 350 may adaptively change its AP discovery mode according to a certain condition. First, when operation 500 is initiated, the station 350 scans both of the 2.4 GHz and 5 GHz frequency bands for AP discovery as an initial operation (operation 502). Such a mode for discovering an AP as mentioned above may be referred to as a full-band scanning mode. When the whole bands for use in the WLAN 400 are scanned, but the discovery of an AP that uses a particular SSID (e.g., the SSID "mobile") to announce its own presence fails (operation 504), the station 350 continues to discover an AP in the full-band scanning mode (operation 502).

When an AP sending the particular SSID (e.g., the SSID "mobile") is discovered (operation 504), the station 350 connects to the discovered AP (operation 506).

In order that the station 350 may perform a subsequent scanning operation only on a particular frequency band for available wireless channels, the frequency band to be subsequently scanned by the station 350 is limited to the frequency band used by the station 350 to connect to the discovered AP (operation 508). Such an AP discovery mode of the station 350 may be referred to as a limited band scanning mode.

Scanning of the frequency band, which is set as mentioned above, is started (operation 510).

When, in the course of the scanning (operation 510), it is determined that it is not necessary to scan, during a subsequent scanning operation, a frequency band different from the currently-scanned frequency band (operation 512), the process 500 proceeds to operation 510 of scanning the currently-set frequency band unless conditions for roaming between APs (for example, the station 350 has discovered a new AP that represents a greater RSSI than that of the currently-connected AP) are satisfied (operation 516). When the roaming conditions are satisfied (for example, when the station 350 discovers the new AP as described above) (operation 516), the station 350 connects to the new AP (operation 518) and then scans the frequency band that has already set and is used for the new connection as well (operation 510).

When, in the procedure of the scanning (operation 510), it is determined that it is necessary to scan, during a subsequent scanning operation, a frequency band different from the currently-scanned frequency band (operation 512), the frequency band to be scanned by the station 350 is changed to the whole of the frequency bands (operation 514). Then, scanning of the whole frequency bands is performed (operation 502), and the subsequent operations may be repeatedly in a similar manner.

As a detailed illustration, when the station 350 moves in the WLAN 300 along the arrows of FIG. 3, the process 500 of FIG. 5 may be performed as follows. The station 350 that may be present in the WLAN 300 is initialized and scans both of the 2.4 GHz and 5 GHz frequency bands (operation 502). When both of the frequency bands are scanned, but none of the APs 131, 133, 135, 137, 161, 163, and 165 transmitting the SSID "mobile" are discovered (operation 504), the station 350 continues the AP discovery in the full-band scanning mode (operation 506). When the station 350 is present in the area 310 of the WLAN 300 and discovers the AP 133 transmitting the SSID "mobile" as an AP to which to connect (operation 504), the station 350 connects to the AP 133 (operation 506). As shown in FIG. 3, the AP 133 provides wireless connections over the 2.4 GHz frequency band. The station 350 limits the frequency band to be subsequently scanned to the 2.4 GHz frequency band (operation 508). Then, the station 350 scans only the 2.4 GHz frequency band (operation 510). When, in the course of the scanning (operation 510), it is determined that it is not necessary for the station 350 to scan the 5 GHz frequency band (operation 512), the station 350 operates as follows. When the 2.4 GHz frequency band is scanned, but the roaming conditions are not satisfied (operation 516), a connection between the station 350 and the AP 133 is maintained as it is, and the 2.4 GHz frequency band is scanned again (operation 510). On the other hand, when the roaming conditions are satisfied (for example, when the new AP 135 represents a greater RSSI than that of the currently-connected AP 133 and, therefore, is discovered as an AP to which the station 350 is to newly connect) (operation 516), the station 350 connects to the AP 135 and then still scans only the 2.4 GHz frequency band (operation 510). Meanwhile, when the station 350 is set to scan only the 2.4 GHz frequency band but determines that it is necessary to scan the 5 GHz frequency band (operation 512), the AP discovery mode of the station 350 is changed to the full-band scanning mode (operation 514). By way of example, it is assumed that the station 350 determines that the roaming conditions are satisfied through the scanning operation on the 2.4 GHz frequency band (operation 516) and connects to the newly discovered AP 137 (operation 518). Then, when the station 350 receives a signal indicating that the wireless connection between the station 350 and the AP 137 is lost (e.g., when the station 350 has left the region 310), the frequency band to be scanned by the station 350 may be changed from the 2.4 GHz frequency band to the whole frequency bands including the 2.4 GHz and 5 GHz frequency bands (operation 514). As another example, when it is recognized that the station 350 is connected to the AP 137 (and, therefore, it is highly likely that the station 350 is located in a boundary region between the area 310 and the area 330 since the AP 137 is located in the boundary region), the AP discovery mode of the station 350 may be changed into the full-band scanning mode (operation 514). The subsequent operations may be the same as those subsequent to operation 502 for both of the 2.4 GHz and 5 GHz frequency bands.

Exemplary Criterion for Changing AP Discovery Mode

There may be various criteria for changing the AP discovery mode of a station from a limited band scanning mode to a full-band scanning mode. The following examples are illustrative of how to determine whether it is necessary for the station 350 to scan the 5 GHz frequency band if the AP discovery mode of the station 350 is set to the mode for scanning only the 2.4 GHz frequency band while the station 350 moves along the arrows shown in FIG. 3.

As one example, when the station 350 determines that the station 350 has passed through a boundary region between the area 310 and the area 330 and left the area 310, the station 350 may change its AP discovery mode into the full-band scanning mode. The station 350 may determine, based on a signal indicating that its wireless connection using the 2.4 GHz frequency band is lost, that the station 350 has moved out of the area 310. The signal indicating such disconnection may be transmitted from the operating system (for example, the operating system 454) of the station 350 to the station 350. For instance, if a connection management/control software module such as the software module 456-1 of the station 350 receives the signal indicating the disconnection, the AP search mode of the station 350 may be changed into the full-band scanning mode with support of the software module.

As another example, when the station 350 determines that the station 350 is located in a boundary region between the area 310 and the area 330, the station 350 may change its AP discovery mode into the full-band scanning mode. Unlike the above-mentioned criterion (i.e., whether the station 350 has actually left the area 310), this approach suggests that when the station 350 is likely to enter the area 330 soon, the station 350 performs a scanning operation on the 5 GHz frequency band as well as the 2.4 GHz frequency band. Accordingly, the connection of the station 350 may be prevented from being lost while the station 350 is receiving, e.g., a VoIP service. As described below, whether the station 350 is located in a boundary region between the area 310 and the area 330 may be determined based on a quality of a link which it uses for data transmission and/or information indicating one or more wireless devices (for example, APs) located in the boundary region. This is because the quality of the link for use in the data transmission may deteriorate when the station 350 is located in the boundary region between the area 310 and the area 330, and the station 350 may be regarded as being located in the boundary region when the station 350 is connected to an AP located in the boundary region.

First, based on the quality of the link for use in the data transmission, the AP discovery mode may be changed as follows. When the quality of the link has become worse, the station 350 may determine that it is necessary to scan a frequency band different from the currently-scanned frequency band. For example, the station 350 may measure the link quality for the wireless connection using the 2.4 GHz frequency band to compare the measured link quality with a certain threshold value, and then determine, based on a result of the comparison, that it is necessary to scan the 5 GHz frequency band.

The link quality may be measured using a parameter including an RSSI. In addition to or instead of the RSSI, the parameter may include a link quality indication (LQI), a frame error rate (FER), a channel rate and/or a noise figure. For example, when the station 350 is connected to the AP 137 but an RSSI indicating a level of a signal received from the AP 137 is equal to or less than a specific level (e.g., RSSI_min), especially when the RSSI is maintained at the specific level (e.g., RSSI_min) or less during more than a specific time (e.g., T_RSSI_max), the station 350 may determine that the station 350 is located in the boundary region between the area 310 and the area 330, and change the AP discovery mode into the full-band scanning mode.

Next, based on the information indicating a wireless device (for example, an AP) which is located in a boundary region of the two regions 310 and 330 in which the different frequency bands are used for the wireless connection, the AP discovery mode may be changed as follows. For example, the station 350 may acquire information indicating the AP 137 which provides a wireless connection using the 2.4 GHz frequency band and is located in the boundary region between the area 310 and the area 330. Based on the acquired information, the station 350 may check that the currently connected AP for providing a wireless connection over the 2.4 GHz frequency band is located in the boundary region between the area 310 and the area 330. For example, when the station 350 is connected to the AP 137, the station 350 may check that the AP 137 is included among the APs indicated by the acquired information, thereby determining that it is necessary to scan the 5 GHz frequency band. In response to such determination, the station 350 may change its AP discovery mode into the full-band scanning mode.

Moreover, in accordance with certain embodiments, when the station 350 is connected to the AP 137, the station 350 may check that the AP 137 to which the station 350 is connected is included among the APs indicated by the acquired information, and also use the link quality so as to determine that it is necessary to scan the 5 GHz frequency band. For example, in the process 600 shown in FIG. 6, this approach applies to determining whether it is necessary to scan another frequency band. The other operations of the process 600 of FIG. 6 may be the same as those of the process 500 of FIG. 5. In accordance with these embodiments, it is possible to keep the station 350 from unnecessarily scanning the whole frequency bands when the station 350 is located not in the boundary region between the area 310 and the area 330 but in a region where the link quality is poor (for example, a shadow region).

Figure 6:
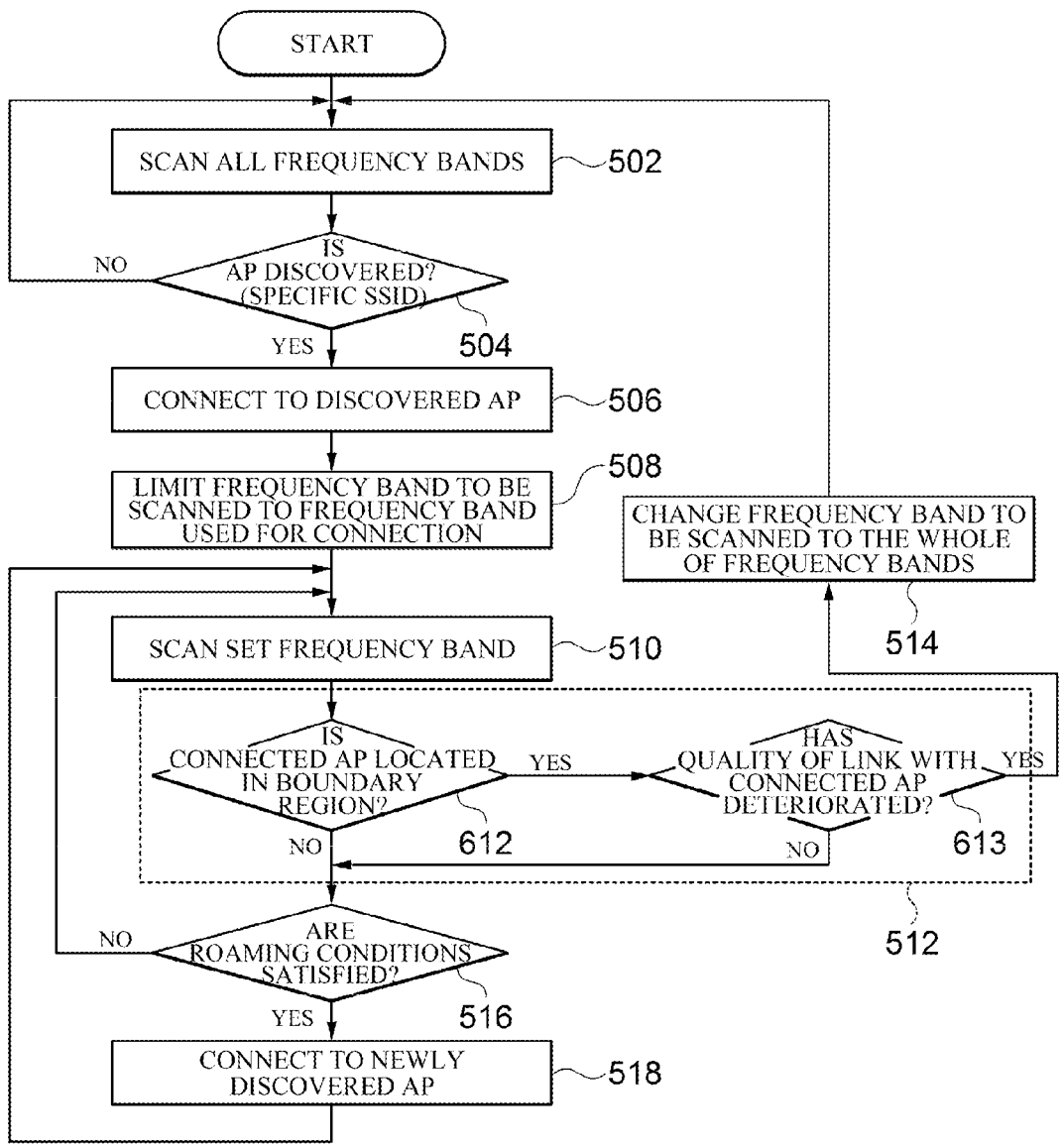

With reference to FIG. 6, the following illustration shows where the station 350 connects to the AP 137 (operation 506) and a subsequent scanning operation is set to be performed on the 2.4 GHz frequency band (operation 508). During the subsequent scanning operation on the 2.4 GHz frequency band (operation 510), the station 350 determines whether the AP 137 connected to the station 350 is located in a boundary region between the area 310 and the area 330 (operation 612). When it is determined that the AP 137 is located in the boundary region, the station 350 determines whether a quality of a link with the AP 137 has deteriorated (operation 613). As described above, determining whether the link quality has deteriorated may involve measuring the link quality and comparing the measured link quality with a certain threshold value and, in the measurement of the link quality, a parameter including an RSSI may be used. When the link quality has deteriorated, the station 350 changes its AP discovery mode into the full-band scanning mode (operation 514). When the AP connected to the station 350 is not located in the boundary region between the area 310 and the area 330, or when the station 350 is located in the boundary region but the quality of the link has not deteriorated, the station 350 continues to perform scanning of the 2.4 GHz frequency band.

Acquiring of Information Indicating an AP Located in a Boundary Region

The station 350 may acquire information indicating one or more APs (e.g., the AP 137) located in a boundary region between the area 310 and the area 330. The acquiring of the information may be performed as follows. However, the following examples are merely illustrative.

The station 350 may has stored therein (e.g., in a memory of the station 350) information regarding which AP(s) is(are) located in the boundary region between the area 310 and the area 330. For example, the station 350 may maintain the information in such a manner as to store a history that the station 350 has been connected to the AP 137 to move from the area 310 to the area 330, and if necessary, may use the information.

The station 350 may receive, from an AP, information regarding whether the AP is located in a boundary region between the area 310 and the area 330. For example, the station 350 may receive boundary region AP information included in a beacon frame of the AP 137. This information may indicate that the AP 137 is located in the boundary region between the area 310 and the area 330. By way of another example, the station 350 may transmit a probe request message to the AP 137, and then receive, from the AP 137, a probe response message including boundary region AP information.

The station 350 may acquire, from a certain server (e.g., the access control server 440) communicatively connected with all or some of the APs 131, 133, 135, 137, 161, 163, and 165, information regarding an AP located in a boundary region between the area 310 and the area 330. The information may be acquired from the above-mentioned server after the station 350 is connected to the AP 131, 133, 135, 137, 161, 163, or 165, or may be acquired when the station 350 inquires of the server after entering into the area 310 or 330. The server may control the connection of the station 350, and have a variety of information for supporting the APs 131, 133, 135, 137, 161, 163, and 165 at the backend of the APs 131, 133, 135, 137, 161, 163, and 165. For instance, the server may have a list of the APs 131, 133, 135, 137, 161, 163, and 165 located in the boundary region between the area 310 and the area 330.

A proper combination of the aforementioned approaches may be adopted. In conjunction with FIGS. 7 and 8, the following description provides exemplary processes performed by a station for acquiring, from such a access control server, information indicating an AP located in a boundary region. These processes are described below as being performed in the WLAN 400 environment of FIG. 4, although such description is merely exemplary. In the following description, it should be appreciated that operations of the station 450 can be implemented by the software module 456-1 of the station 450.

Figure 7:
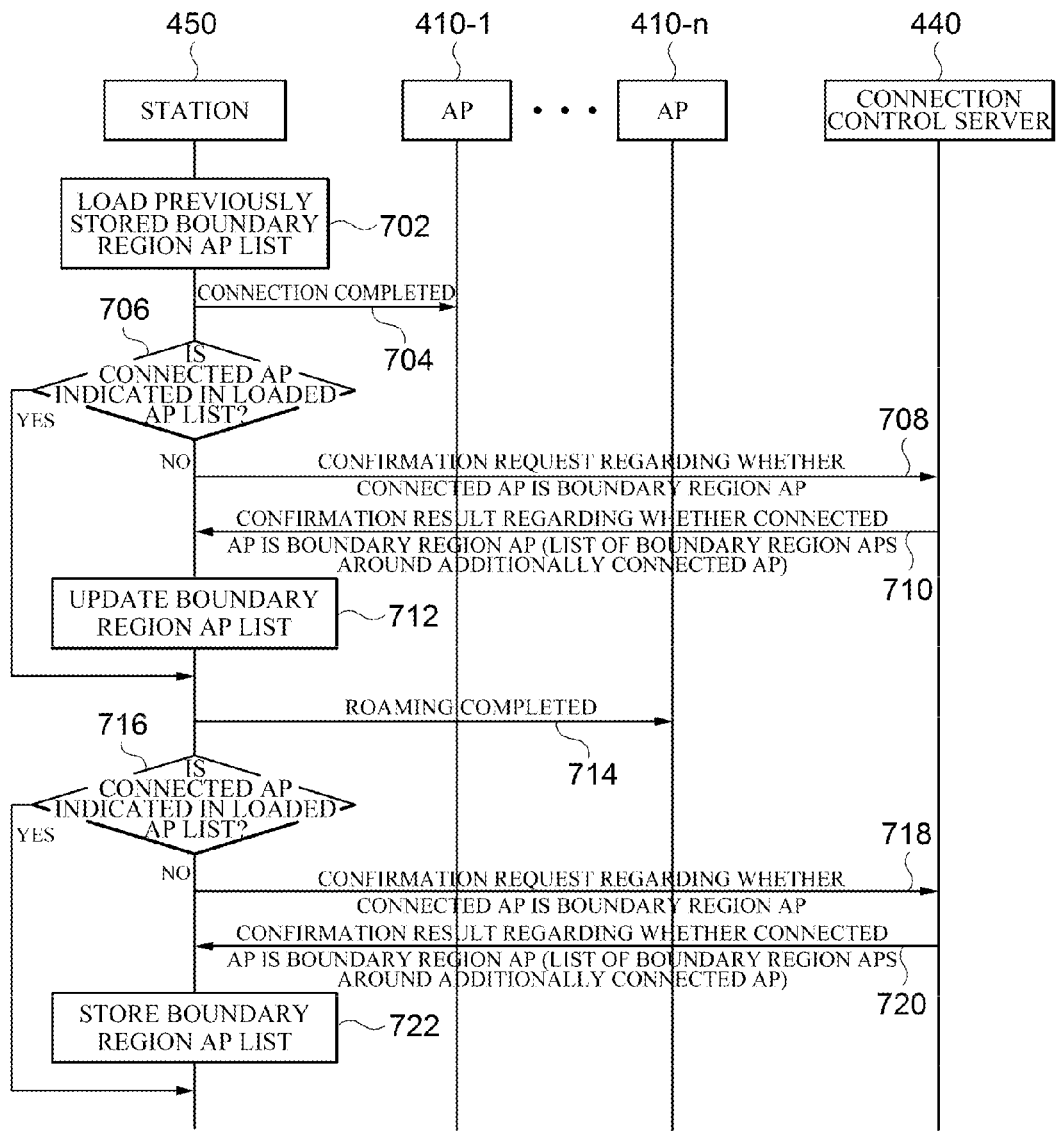
FIGS. 7 and 8 are respective flowcharts of exemplary processes in which a station acquires, from a access control server, information indicating an AP located in a boundary region.

According to the process 700 shown in FIG. 7, the station 450 loads previously-stored information regarding an AP which is located in a boundary region between two areas where different frequency bands are used for wireless connections (and also may hereinafter be referred to as a "boundary region AP") (operation 702). For example, the boundary region AP information may have a structure of a list form. Next, the station 450 connects to the AP 410-1 (operation 704). If the connected AP 410-1 is listed in the boundary region AP information, then the station 450 may roam to another AP (e.g., AP 410-$n$) (operation 714). When the connected AP 410-1 is not listed in the boundary region AP information, the station 450 sends, to the access control server 440, a request for confirmation as to whether the AP 410-1 is a boundary region AP (operation 708). The station 450 receives, from the access control server 440, a result of the confirmation (operation 710). While transmitting the confirmation result, the access control server 440 may also transmit information indicating a boundary region AP among APs located around the AP 410-1. The station 450 updates the boundary region AP list with the confirmation result and the information received from the access control server 440 (operation 712). Then, the station 450 may roam to another AP (e.g., the AP 410-$n$) (operation 714). After the station 450 is connected to the AP 410-$n$ through the roaming operation, the station 450 may perform operations similar to those performed after its connection to the AP 410-1. That is, when the connected AP 410-$n$ is listed in the boundary region AP information (operation 716), the station 450 may roam to still another AP (not shown). When the connected AP 410-1 is not listed in the boundary region AP information (operation 716), the station 450 requests the access control server 440 to confirm whether the AP 410-$n$ is a boundary region AP (operation 718). The station 450 receives, from the access control server 440, a result of the confirmation (operation 720). While transmitting the confirmation result to the station 450, the access control server 440 may also transmit information indicating a boundary region AP among APs located around the AP 410-$n$. The station 450 updates the boundary region AP list again with the confirmation result and the information received from the access control server 440 (operation 722).

Figure 8:
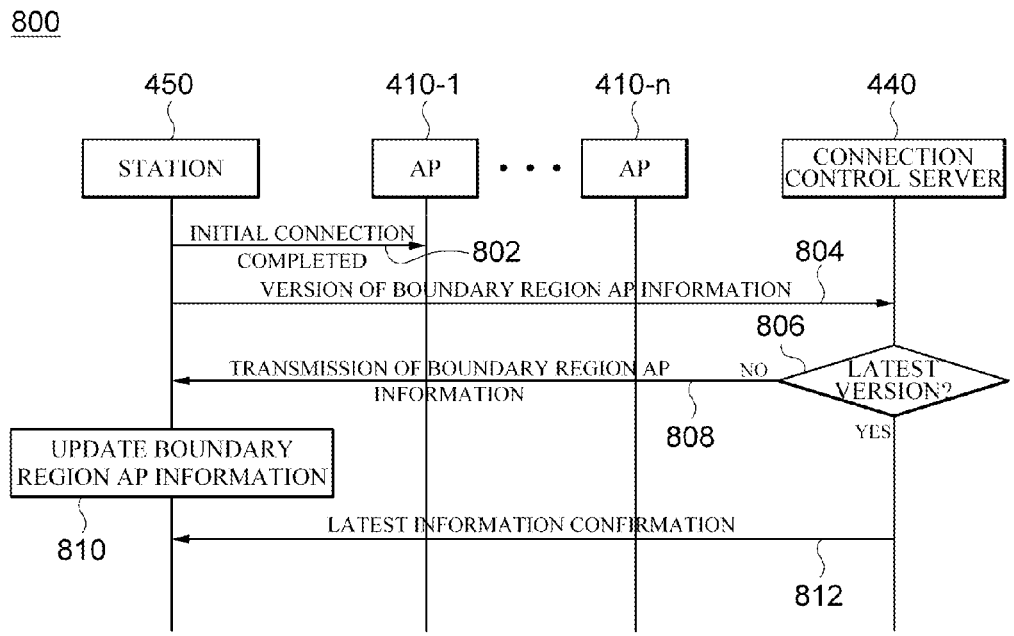

According to operation 800 shown in FIG. 8, the station 450 establishes an initial connection with the AP 410-1 (operation 802), and then informs the access control server 440 of a version of the boundary region AP information stored in the station 450 (operation 804). The access control server 440 confirms whether the version is the latest one (operation 806). When the boundary region AP information of the station 450 is not the latest version, the access control server 440 transmits the latest version of the boundary region AP information to the station 450 (operation 808), and the station 450 updates the boundary region AP information (operation 810). When the boundary region AP information of the station 450 is the latest version, the access control server 440 transmits a message confirming the latest information (operation 812).

Application of a Criterion for Changing an AP Discovery Mode According to a Communication State The above-mentioned criteria for changing an AP discovery mode may be used selectively or in any proper combination according to a data communication state.

The station 350 may monitor a state of data communication across a wireless connection of the station 350, and adaptively apply a criterion for determining whether it is necessary to change its AP discovery mode according to the monitored data communication state. Such monitoring and application may be implemented by the software module (for example, the software module 456-1) of the station 350.

For example, it is assumed that the AP discovery mode of the station 350 is set such that the station 350 scans the 2.4 GHz frequency band. The station 350 monitors a data communication state, and according to the monitored state, selects one of a plurality of schemes for determining whether it is necessary to scan the 5 GHz frequency band.

When the monitored state is an inactive state (for example, there is no data communication on the station 350), a scheme may be selected for determining, based on whether a signal indicating a loss of the wireless connection of the station 350 over the 2.4 GHz frequency band is received, whether it is necessary to scan the 5 GHz frequency band.

Meanwhile, when the monitored state is an active state (for example, when VoIP communication continues on the station 350), a scheme may be selected for using an RSSI or link quality and/or boundary region AP information. Specifically, a scheme may be selected for determining, based on a link quality for the wireless connection of the station 350 over the 2.4 GHz frequency band, whether it is necessary to scan the 5 GHz frequency band. On the other hand, a scheme may be selected for determining, based on whether the AP connected to the station 350 over the 2.4 GHz frequency band (for example, the AP 137) is included in the boundary region APs, whether it is necessary to scan the 5 GHz frequency band may be selected. In the latter scheme, whether it is necessary to scan the 5 GHz frequency band may be further based on the link quality for the wireless connection of the station 350 over the 2.4 GHz frequency band.

Ensuring of Service Continuity for a Terminal that does not Support a Particular Frequency Band For example, when the station 350 supports only the 2.4 GHz frequency band in the WLAN 300, the station 350 cannot connect to the APs 161, 163, and 165 that support only the connections over the 5 GHz frequency band in the area 330, even if the station 350 enters the area 330. Therefore, in order to prevent an interruption to the service provided to the station 350, a certain AP that propagates an SSID dedicated to the station 350, for example, indicated as "SSID: mobile_2G," in the 2.4 GHz frequency band may be placed in the area 330. When a moderate number of stations that do not support the 5 GHz frequency band but support only the 2.4 GHz frequency band exist in the WLAN 300, such an approach may be useful to provide service continuity to the stations while reducing radio interference caused in the area 330 by the 2.4 GHz frequency band.

Figure 9:
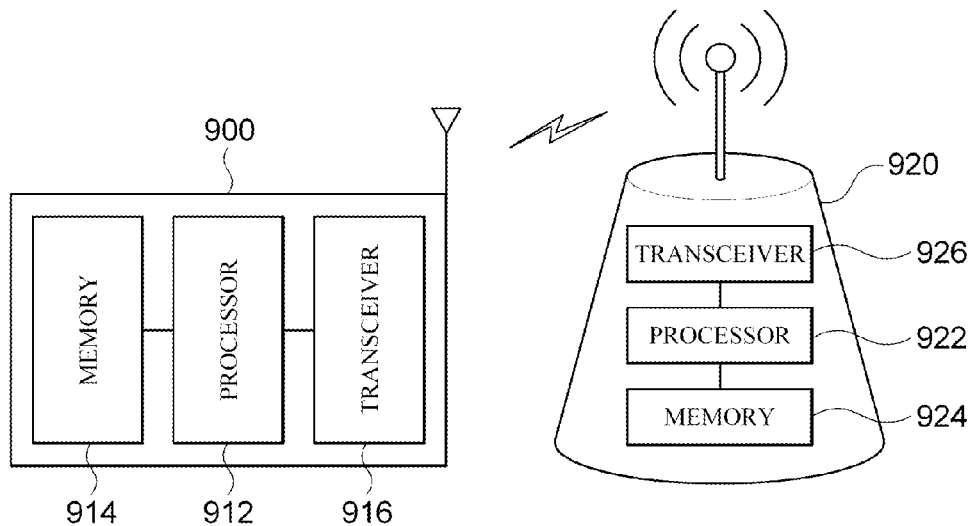
FIG. 9 shows block diagrams of a wireless device and a mobile device for implementing an exemplary embodiment of the present disclosure.

FIG. 9 shows block diagrams of a wireless device and a mobile device for implementing an exemplary embodiment of the present disclosure.

A mobile device 900 includes a processor 912, a memory 914, and a transceiver 916. A wireless device 920 includes a processor 922, a memory 924, and a transceiver 926. The mobile device 900 may be a station (e.g., the stations 350 and 450) in a WLAN. The wireless device 920 may be an AP (e.g., the APs 131, 133, 135, 161, 163, 165, and 410-1 to 410-n) in the WLAN.

The transceivers 916 and 926 are connected to the processors 912 and 922 to exchange radio signals under the control of the processors 912 and 922, respectively. For example, the transceivers 916 and 926 may implement the physical layer conforming to the IEEE 802.11 standard. According to the above-described exemplary embodiments of the present disclosure, the processors 912 and 922 may operate the devices 900 and 920, respectively. The processors 912 and 922 may execute instructions stored in the memories 914 and 924, respectively. When the instructions stored in the memories 914 and 924 are executed by the processors 912 and 922, respectively, the devices 900 and 920 may be caused to perform operations according to the above-described exemplary embodiments of the present disclosure. The memories 914 and 924 may be inside or outside the processors 912 and 922, respectively, and connected to the processors 912 and 922 by various well-known means, respectively.

Meanwhile, an exemplary embodiment of the present disclosure can include a computer-readable storage medium including a program for performing the methods described herein on a computer. The computer-readable storage medium may separately include program commands, local data files, local data structures, etc. or include a combination of them. The computer-readable storage medium may be specially designed and configured for the present disclosure, or known and available to those of ordinary skill in the field of computer software. Examples of the computer-readable storage medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and execute program commands. Examples of the program commands may include high-level language codes executable by a computer using an interpreter, etc., as well as machine language codes made by compilers.

According to exemplary embodiments of the present disclosure, it is possible to maintain a high quality of service (QoS) and ensure service continuity for a mobile device that is provided with a service through a wireless network in which multiple frequency bands are used.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A communication method implemented in a mobile device, comprising:
   limiting a frequency band on which the mobile device performs a scanning operation to a first frequency band used for a wireless connection of the mobile device;
   acquiring information indicating one or more wireless devices;
   determining whether it is necessary to scan a second frequency band during a subsequent scanning operation of the mobile device based on whether a first wireless device connected with the mobile device using the first frequency band is included in the one or more wireless devices; and
   in response to determining that it is necessary to scan the second frequency band, allowing the subsequent scanning operation to be performed on a plurality of frequency bands including the first and second frequency bands,
   wherein the one or more wireless devices provide wireless connections using the first frequency band, and wherein the one or more wireless devices are located in a boundary region between a first region in which the first frequency band is used for a wireless connection of the mobile device and a second region in which the second frequency band is used for a wireless connection of the mobile device.

2. The communication method of claim 1, further comprising limiting a frequency band on which another subsequent scanning operation of the mobile device is performed to a frequency band which is used for a wireless connection of the mobile device after the subsequent scanning operation is performed on the plurality of frequency bands.

3. The communication method of claim 1, wherein the determining of whether it is necessary to scan the second frequency band is based on whether a signal indicating a loss of the wireless connection of the mobile device using the first frequency band is received.

4. The communication method of claim 1, wherein the determining of whether it is necessary to scan the second frequency band is based on a quality of a link for the wireless connection of the mobile device using the first frequency band.

5. The communication method of claim 4, further comprising measuring the quality of the link using a parameter including a received signal strength indication (RSSI).

6. The communication method of claim 1, wherein the determining of whether it is necessary to scan the second frequency band is based on a quality of a link for the wireless connection of the mobile device using the first frequency band.

7. The communication method of claim 6, further comprising measuring the quality of the link using a parameter including an RSSI.

8. The communication method of claim 1, wherein the information is acquired from a server communicatively connected with the first wireless device.

9. The communication method of claim 1, wherein the plurality of frequency bands include a 2.4 GHz frequency band and a 5 GHz frequency band.

10. The communication method of claim 1, further comprising:
monitoring a state of data communication across the wireless connection of the mobile device; and
in accordance with the monitored state, selecting one of a plurality of schemes for determining whether it is necessary to scan the second frequency band.

11. The communication method of claim 10, wherein when the monitored state is an inactive state, the selected scheme includes determining, based on whether a signal indicating a loss of the wireless connection of the mobile device is received, whether it is necessary to scan the second frequency band.

12. The communication method of claim 10, wherein when the monitored state is an active state, the selected scheme includes determining, based on a quality of a link for the wireless connection of the mobile device using the first frequency band, whether it is necessary to scan the second frequency band.

13. The communication method of claim 10, further comprising acquiring information indicating one or more mobile devices,
wherein when the monitored state is an active state, the selected scheme includes determining, based on whether a first wireless device connected with the mobile device using the first frequency band is included in the one or more mobile devices, whether it is necessary to scan the second frequency band.

14. The communication method of claim 13, wherein the selected scheme further includes determining, based on a quality of a link for the wireless connection of the mobile device using the first frequency band, whether it is necessary to scan the second frequency band.

15. A non-transitory computer-readable storage medium having computer executable instructions stored thereon which, when executed by a mobile device, implement a communication method, the communication method comprising:
limiting a frequency band on which the mobile device performs a scanning operation to a first frequency band used for a wireless connection of the mobile device;
acquiring information indicating one or more wireless devices;
determining whether it is necessary to scan a second frequency band during a subsequent scanning operation of the mobile device based on whether a first wireless device connected with the mobile device using the first frequency band is included in the one or more wireless devices; and
in response to determining that it is necessary to scan the second frequency band, allowing the subsequent scanning operation to be performed on a plurality of frequency bands including the first and second frequency bands,
wherein the one or more wireless devices provide wireless connections using the first frequency band, and wherein the one or more wireless devices are located in a boundary region between a first region in which the first frequency band is used for a wireless connection of the mobile device and a second region in which the second frequency band is used for a wireless connection of the mobile device.

16. A mobile device comprising:
a communicator configured to communicate over a first frequency band and a second frequency band; and
a controller configured to control the communicator to communicate over the first frequency band, acquire information indicating one or more wireless devices, determine whether it is necessary to scan the second frequency band during a subsequent scanning operation of the mobile device based on whether a first wireless device connected with the mobile device using the first frequency band is included in the one or more wireless devices, and in response to determining that it is necessary to scan the second frequency band, control the communicator to perform a scanning operation of the first frequency band and the second frequency band,
wherein the one or more wireless devices provide wireless connections using the first frequency band, and wherein the one or more wireless devices are located in a boundary region between a first region in which the first frequency band is used for a wireless connection of the mobile device and a second region in which the second frequency band is used for a wireless connection of the mobile device.

* * * * *